United States Patent [19]

Garland et al.

[11] Patent Number: 4,948,072
[45] Date of Patent: Aug. 14, 1990

[54] SEGMENTED VECTORING CRUISE NOZZLES

[75] Inventors: Douglas Garland, Rexdale; Joseph E. Farbridge, Thornhill, both of Canada

[73] Assignee: Boeing of Canada Ltd., Downsview, Canada

[21] Appl. No.: 307,810

[22] Filed: Feb. 8, 1989

[51] Int. Cl.⁵ ............................................. B64C 29/00
[52] U.S. Cl. ................ 244/23 D; 244/23 B; 244/12.5; 239/265.25
[58] Field of Search ................ 244/23 A, 23 B, 23 D, 244/12.4, 12.5, 110 B; 60/232; 239/265.19, 265.23, 265.25

[56] References Cited

U.S. PATENT DOCUMENTS

2,802,333  8/1957  Price et al. ................ 244/23 D
3,081,597  3/1963  Kosin et al. ................ 244/23 D

Primary Examiner—Joseph F. Peters, Jr.
Assistant Examiner—Christopher P. Ellis
Attorney, Agent, or Firm—Rogers, Bereskin & Parr

[57] ABSTRACT

A thrust vectoring structure is provided for VSTOL aircraft having a pressurized gas generator and at least one rearward facing outlet with an opening for discharging pressurized gas from the pressurized gas generator. The thrust vectoring structure has a plurality of horizontal dividers extending between the sides of the opening. A front flap is rotatably mounted adjacent the front edge of the dividers and a rear flap is rotatably mounted adjacent the rear edge of the dividers. The flaps are rotatable from a horizontal position to a vertical position. In the horizontal position the pressurized gas is directed

19 Claims, 10 Drawing Sheets

SEGMENTED VECTORING CRUISE NOZZLES

FIELD OF THE INVENTION

This invention relates to lift and propulsion systems for aircraft, and more particularly to a thrust deflector for vertical and short take-off and landing aircraft.

BACKGROUND OF THE INVENTION

The term "VSTOL aircraft" is used herein to refer to both vertical take-off and landing aircraft and short take-off and landing aircraft. It is known in the art of VSTOL aircraft to deflect thrust from the engines of the aircraft downwardly for take-off or landing. Typical methods for deflecting thrust from the engines include deflector blades, rotatable engine nozzles, and rotating the entire power unit.

Typical VSTOL aircraft, particularly those capable of attaining high speeds, use a combustion engine which acts as a pressurized gas generator which generates pressurized gas for propelling the aircraft. A problem faced by VSTOL aircraft is that the temperature of the pressurized gas is quite high, typically in the range of 1,000° F. and higher, and the pressure is also considerable. When the pressurized gas is directed downwardly, the high temperature and pressure tends to melt tarmac, erode concrete and even heat metal plates below the aircraft to unacceptably high temperatures. The result is that operation of VSTOL aircraft is restricted, and take-off or landing must often be performed with some forward movement to reduce the damage.

SUMMARY OF THE INVENTION

According to the present invention there is provided a thrust vectoring structure for a VSTOL aircraft having a pressurized gas generator and at least one generally rearwardly facing outlet fluidly communicating with the pressurized gas generator and through which the pressurized gas is discharged to provide thrust for the aircraft and in which the outlet has an opening defined by a top, a bottom and sides extending between the top and the bottom, the top and bottom having respective top and bottom edges toward the rear of the aircraft and the top extending rearwardly of the bottom. The thrust vectoring structure has at least one generally horizontal divider extending between the sides of the opening. The divider has a forwardly facing front edge and a rearwardly facing rear edge. The thrust vectoring structure further has a plurality of front and rear flaps. The front flaps are mounted adjacent the top and front edges of the opening of the outlet. The rear flaps are mounted adjacent the rear and bottom edges. Each of the flaps has a leading edge opposite a trailing edge and is rotatable about an axis adjacent and generally parallel to the leading edge. The front and rear flaps are mounted with the leading edges adjacent respective of the top, front, rear and bottom edges. The flaps are rotatable from a horizontal thrust position in which the respective trailing edges of the flaps extend generally rearwardly from the leading edges to a vertical thrust position in which the respective trailing edges of the flaps extend generally downwardly from the leading edges. In the horizontal position the trailing edge of each of the rear flaps extends rearwardly from the leading edge of the front flap immediately above it whereby a generally horizontal thrust nozzle is defined therebetween. In the vertical position the trailing edge of each of the front flaps depends below the leading edge of the rear flap immediately therebelow whereby a generally vertical thrust nozzle is defined therebetween. Each of the dividers and the flaps mounted adjacent thereto define a spacing channel below each of the dividers, the spacing channels are interspersed between the vertical thrust nozzles.

BRIEF DESCRIPTION OF THE DRAWINGS

For a better understanding of the present invention, and to show more clearly how it may be carried into effect, reference will now be made by way of example to the accompanying drawings, in which.

DETAILED DESCRIPTION OF THE INVENTION

The decay of temperature and pressure of a jet of hot air being discharged from an engine nozzle arises from the mixing of the jet with ambient air surounding the jet. A small diameter jet decays much more rapidly than a large diameter jet in the same physical distance. The thrust vectoring structure of the present invention divides the large jet emanating from the aircraft engine into a number of smaller jets. The smaller jets are spaced apart in the vertical direction to promote their mixing with ambient air resulting in considerably more rapid temperature and pressure decay than that of the large jet.

Figure 7:
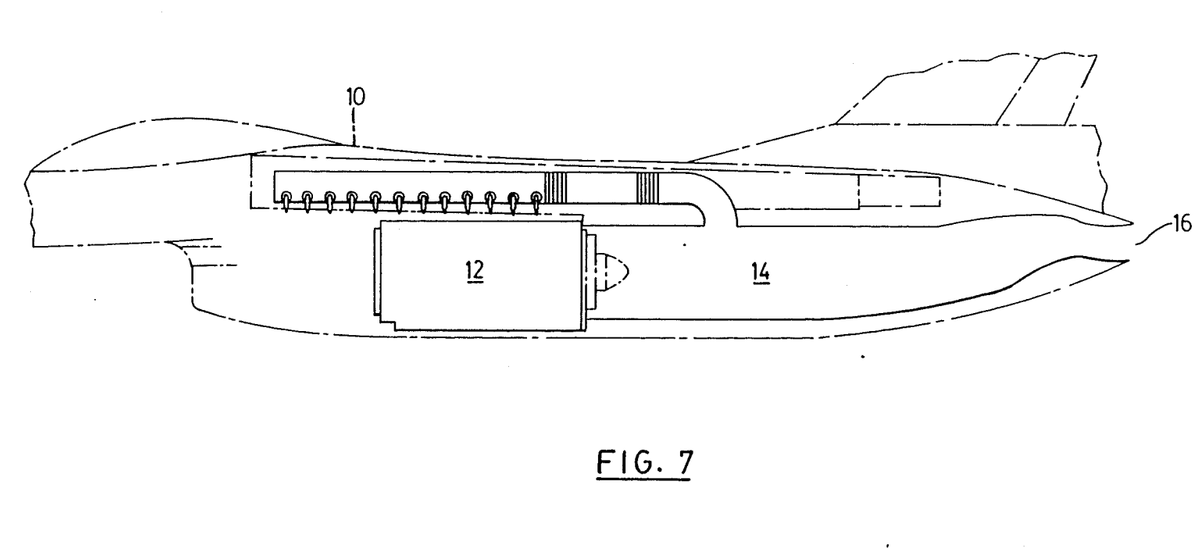
FIG. 7 is a diagramatic side view of a VSTOL aircraft showing the general layout of various components.
Figure 10:
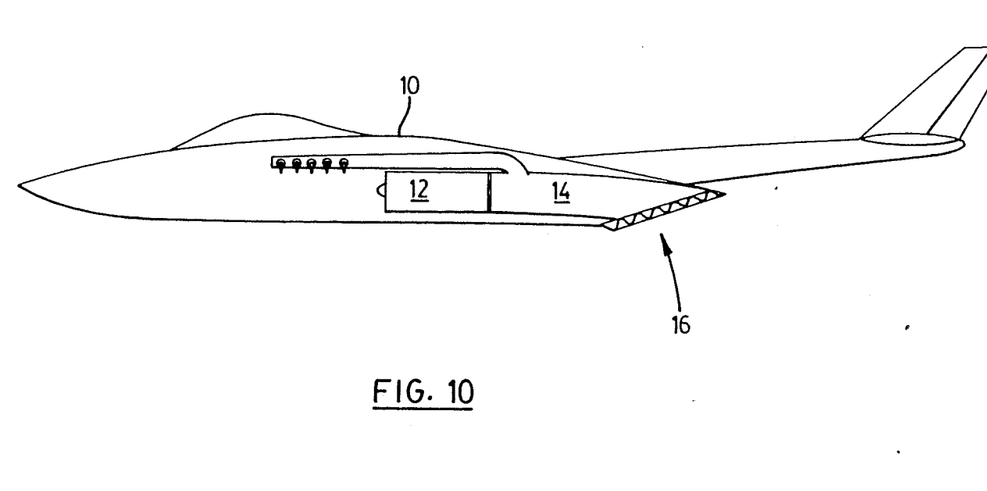
FIG. 10 is a diagramatic sectional view, along the center line of the fuselage of a VSTOL aircraft having a "pod and boom" type of fuselage and incorporating a thrust vectoring structure according to the present invention.

First referring to FIG. 7, the outline of a portion of the fuselage 10 of an aircraft is shown in dashed lines. The fuselage has a front toward the left of FIG. 1 and a rear toward the right of FIG. 1 "forwardly" and "rearwardly" are used to indicate "toward the front" and "toward the rear" respectively. The aircraft has an engine 12 which acts as a pressurized gas generator for generating pressurized gas by the combustion of fuel. Pressurized gas leaves the engine 12 through the passage 14. A portion, or all, of the pressurized gas is discharged from a rearward facing outlet through opening 16 at the rearward end of the fuselage 10. The thrust vectoring structure of the present invention can be mounted across the opening 16 of the outlet. In other aircraft fuselage designs, such as aircraft having twin engine nacelles, one on either side of the fuselage, the vectoring structure could be located in the outlets at the rear of the engine nacelles. Similarly, for aircraft having a pod and boom type of fuselage, the vectoring structure can be located in the outlet at the rear of the pod. This latter arrangement is shown in FIG. 10.

Referring next to FIGS. 1 through 5, the rearward facing outlet is shown in detail. The outlet has an opening 16 defined by a top 18, a bottom 20 and opposed sides extending between the top 18 and the bottom 20. One such side is shown at 22 facing in the plane of FIGS. 1 through 5. The top has a top edge 24 and the bottom has a bottom edge 26. The top edge extends rearwardly of the bottom edge. The rearward edge of the opening is shown at reference 23.

Horizontal dividers 28 extend across the opening between the sides 22. It will be apparent from FIG. 2 that the dividers 28 are generally parallel and are arranged in a generally stepwise configuration. The dividers have a forwardly facing front edge 30 and a rearwardly facing rear edge 32. The front edge 30 of the lower most divider is rearward of and above the bottom edge 26. The front edges 30 of the upper two dividers 28 are above and rearward of the rear edges 32 of the respective dividers immediately below them. The rear edge 32 of the uppermost divider 28 is forward of the top edge 24.

Front flaps 34 are mounted adjacent the front edges 30 of the dividers and the top edge 24 of the opening 16 of the outlet. Rear flaps 36 are mounted adjacent the rear edges 32 of the dividers 28 and the bottom edge 26 of the opening 16 of the outlet. Each of the flaps has a leading edge 38 opposite a trailing edge 40.

The front and rear flaps, 34 and 36 respectively, are mounted so as to be rotatable about respective axes 42, generally parallel to the leading edges 38. In this manner, the rotational axis 42 of each of the front flaps 34 is rearward of and above the rotational axis 42 of one of the rear flaps 36.

FIGS. 1 through 5, 8 and 9 show the front flaps 34 and rear flaps 36 rotated through a variety of positions. Mounting the flaps so that they are rotatable about respective axes 42 may be achieved in various ways, such as having a shaft extending from either end of the flap and generally co-axial with the rotational axis. Each such shaft can be journalled into a bearing having a rotational axis coincident with the rotational axis 42. Movement of the flaps can be effected by various means such as gear and sprocket drives, hydraulic cylinders with levers, screw drives with levers having screw followers, etc.

Figure 1:
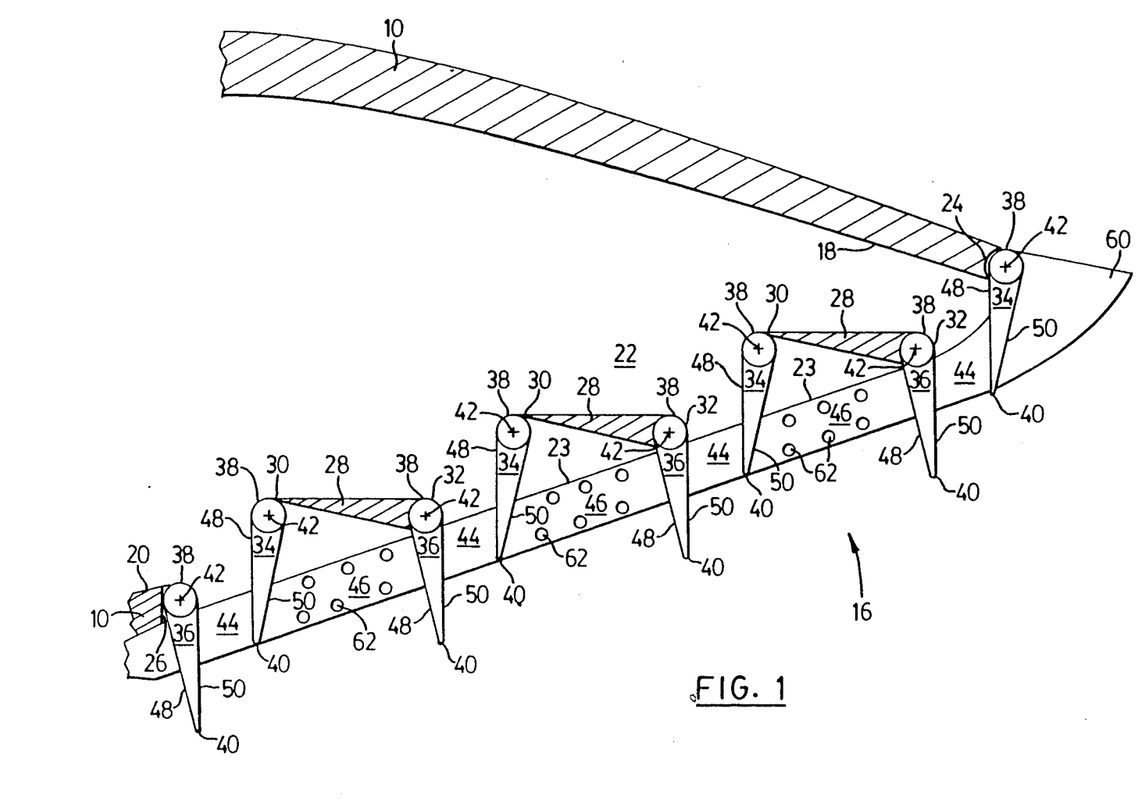
FIG. 1 is a cross sectional view through a thrust vectoring structure according to the present invention showing the structure in its vertical thrust position with the leading faces of the front flaps generally parallel to the trailing faces of the rear flaps.

In FIG. 1 the flaps are shown as being in a vertical position where the trailing edges 40 of the front flaps 34 project below the leading edges 38 of the rear flap 36 immediately below it. In this manner a generally vertical thrust nozzle 44 is defined between adjacent flaps. Each of the dividers 28 along with the front flap 34 and rear flap 36 mounted adjacent thereto defines a spacing channel 46 below each of the dividers. As can be seen from FIG. 1, a spacing channel 46 is interspersed between each of the vertical thrust nozzles 44. In this manner, the pressurized gas being discharged from the outlet 16 is divided into a number of smaller segmented jets. In order to ensure that the pressurized gas is not discharged laterally from the nozzles 44, end plates 60 are provided adjacent the ends of the flaps so as to extend accross the ends of the nozzles 40. To ensure air entry into the ends of the spacing channels 46, holes 62 are provided through the end plates 60 into the ends of the spacing channels 46. The front and rear flaps, 34 and 36 respectively, each have a leading face 48 facing forwardly in FIG. 1, and a trailing face 50 which faces rearwardly in FIG. 1. In the orientation shown in FIG. 1, the leading faces 48 of the front flaps 34 are generally parallel to the trailing faces 50 of the rear flap 36 on the opposite side of the vertical thrust nozzle 44. In this position, thrust resulting from discharge of pressurized gas through the thrust nozzles 44 is in a generally vertical direction.

Figure 8:
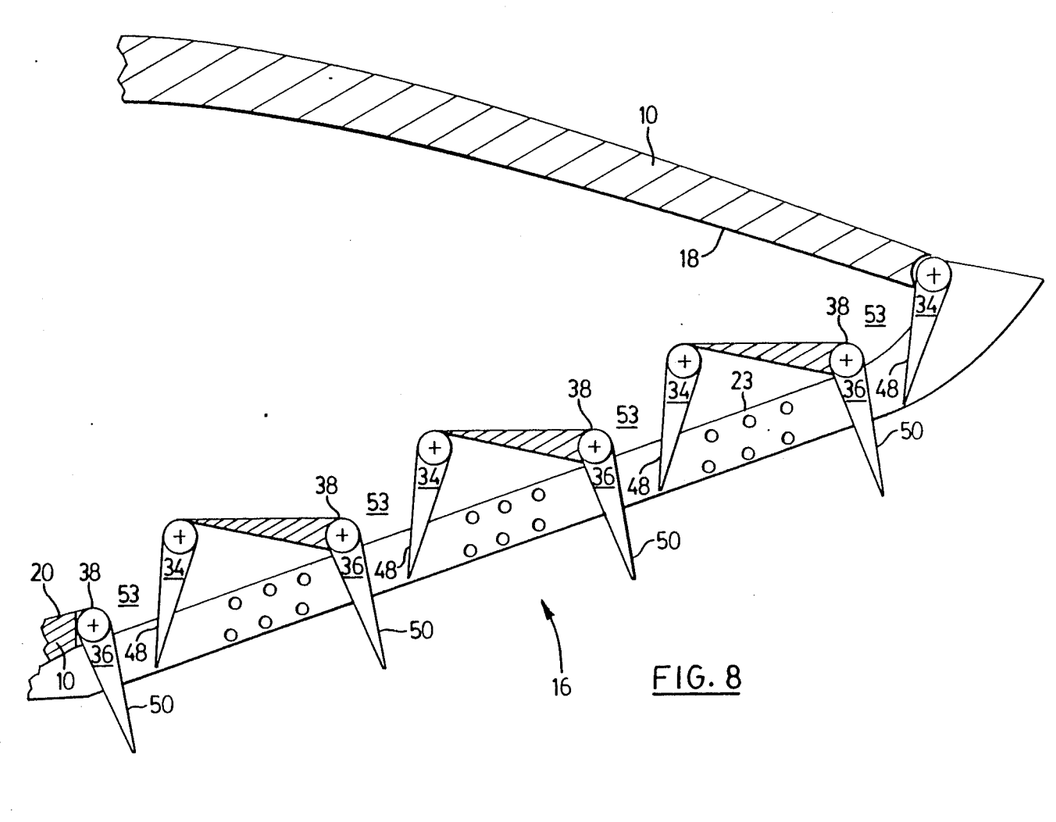
FIG. 8 shows the thrust vectoring structure of FIG. 1 with the flaps rotated so that the leading faces of the front flaps converge with the trailing faces of the opposing rear flaps; and, FIG. 9 shows the thrust vectoring structure of FIG. 1 with the flaps in a horizontal position with the leading faces of the front flaps and the trailing faces of the rear flaps converging to form convergent thrust nozzles.

FIG. 8 shows the front and rear flaps, 34 and 36 respectively, rotated to a vertical convergent position wherein the leading faces 48 of the front flaps 34 and the trailing faces 50 of the rear flaps 36 converge in a downwardly direction away from the leading edge 38 of the rear flaps 36. In this manner, a generally downwardly directed convergent vertical thrust nozzle 53 is formed between the front flaps 34 and the rear flaps 36. (Varying the convergence of the front and rear flaps, 34 and 36 respectively, by rotation of the flaps, may be used to vary the effective area of the opening 16 of the outlet.)

Figure 2:
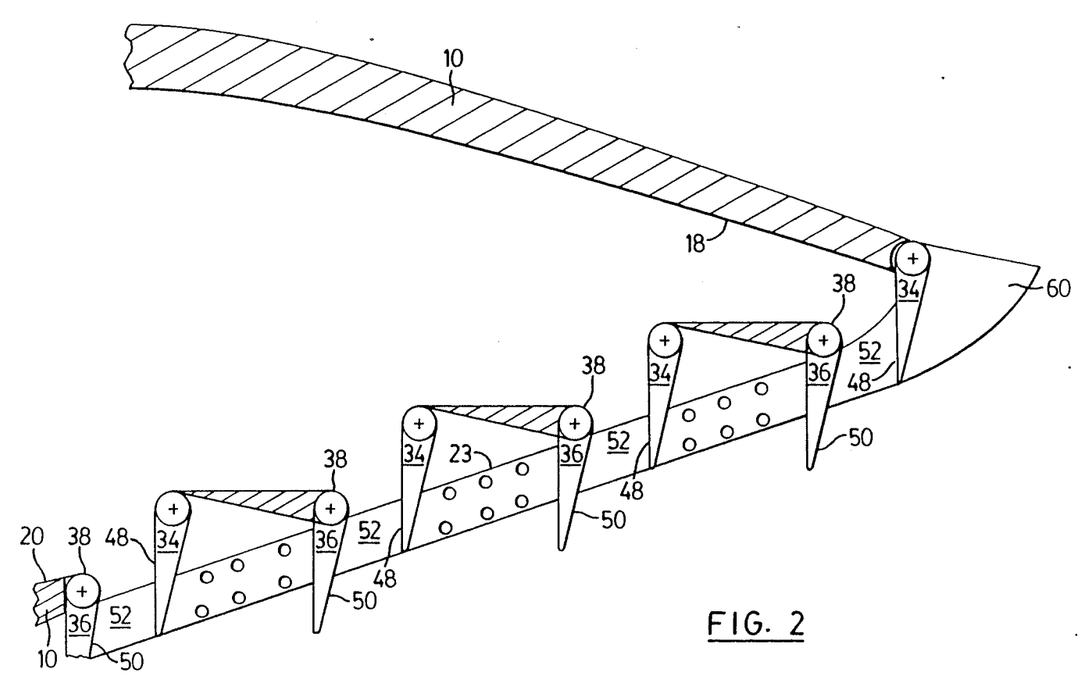
FIG. 2 shows the thrust vectoring structure of FIG. 1 with the flaps rotated so that the leading faces of the front flaps diverge from the trailing faces of the opposing rear flaps.

FIG. 2 shows the front and rear flaps, 34 and 36 respectively, rotated to a vertical divergent position wherein the leading faces 48 of the front flaps 34 and the trailing faces 50 of the rear flaps 36 diverge in a downwardly direction away from the leading edge 38 of the rear flaps 36. In this manner, a generally downwardly directed divergent vertical thrust nozzle 52 is formed between the front flaps 34 and the rear flaps 36.

Figure 4:
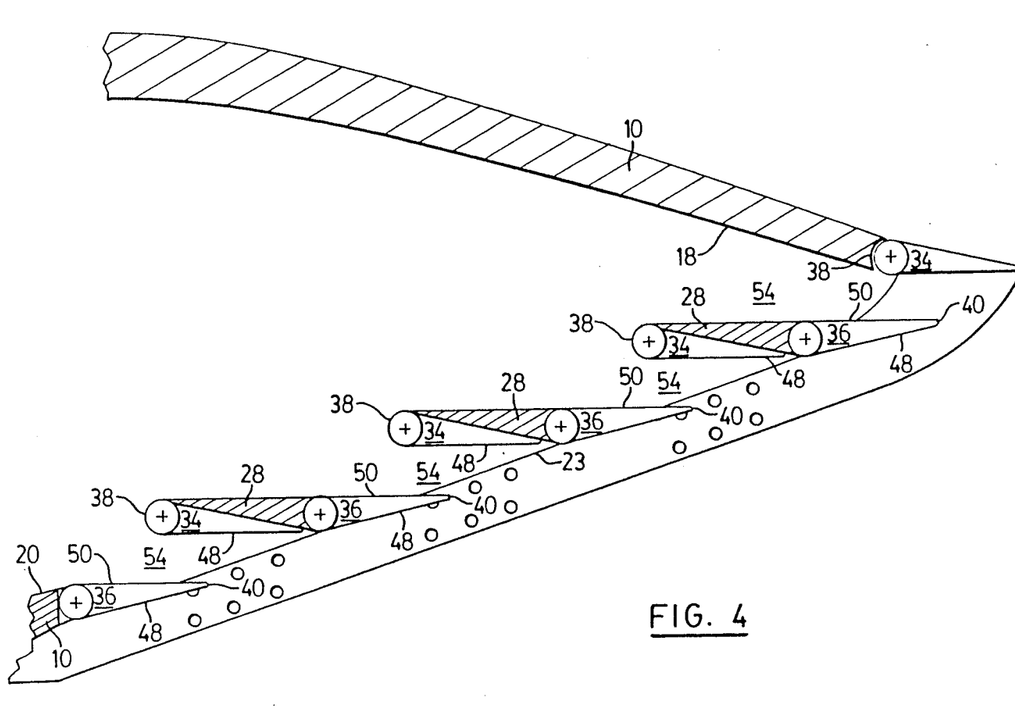
FIG. 4 shows the thrust vectoring structure of FIG. 1 with the flaps rotated to a horizontal position with the leading faces of the front flaps generally parallel to the trailing faces of the rear flaps.
Figure 9:
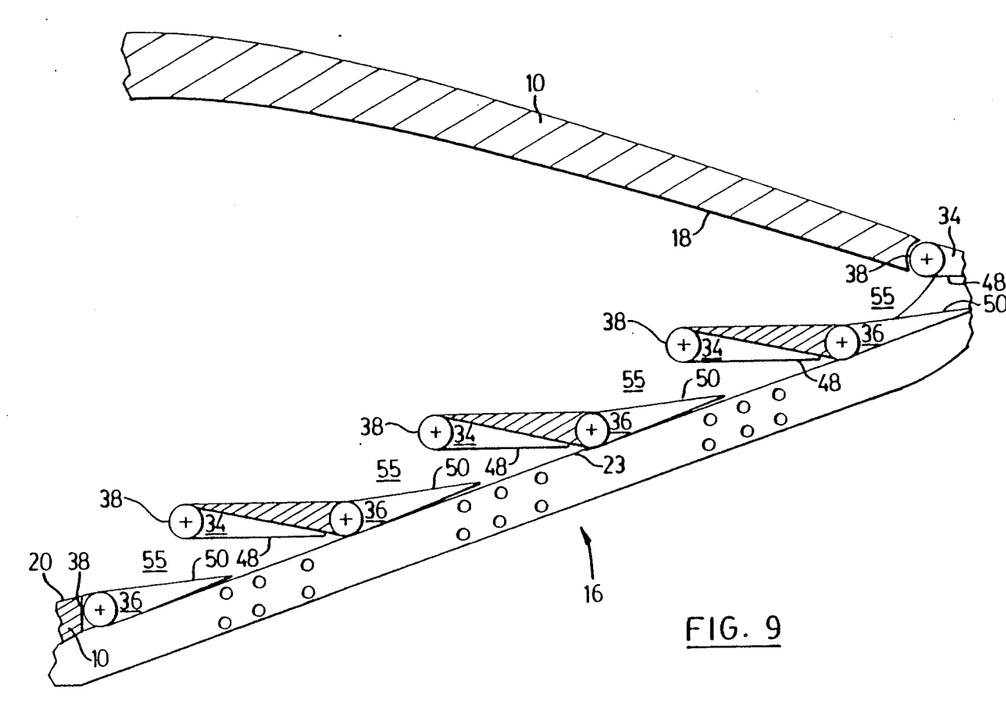

FIG. 4 shows the flaps rotated to a horizontal position in which the trailing edge 40 of each of the rear flaps 36 extends rearwardly from the leading edge 38 of the front flaps 34 immediately above them. In this manner generally horizontal thrust nozzles 54 are defined between the front and rear flaps, 34 and 36 respectively. In the position shown in FIG. 4, the leading face 48 of each of the front flaps 34 is generally parallel to the trailing face 50 of the rear flap 36 on the opposite side of the horizontal thrust nozzle 54. In this configuration, thrust resulting from discharge of the pressurized gas through the horizontal thrust nozzles 54 is directed generally rearwardly. The front and rear flaps, 34 and 36 respectively, may be further rotatable to a horizontal convergent position as shown in FIG. 9 wherein the leading faces 48 of the front flaps and the trailing faces 50 of the rear flaps immediately below them converge away from the leading edge 38 of the rear flaps to form a generally rearwardly directed convergent thrust nozzle 55 therebetween. Such rotation to cause convergence of the thrust nozzles may be used to vary the effective area of the opening 16 of the outlet, much the same as discussed above for the downwardly directed convergent thrust nozzles 53. The configurations shown in FIGS. 4 and 9 would be used for forward subsonic flight. In these configurations the pressurized gas passes around the flaps and the dividers to recombine rearwardly of the trailing edges 40 of the rear flaps 36.

Figure 5:
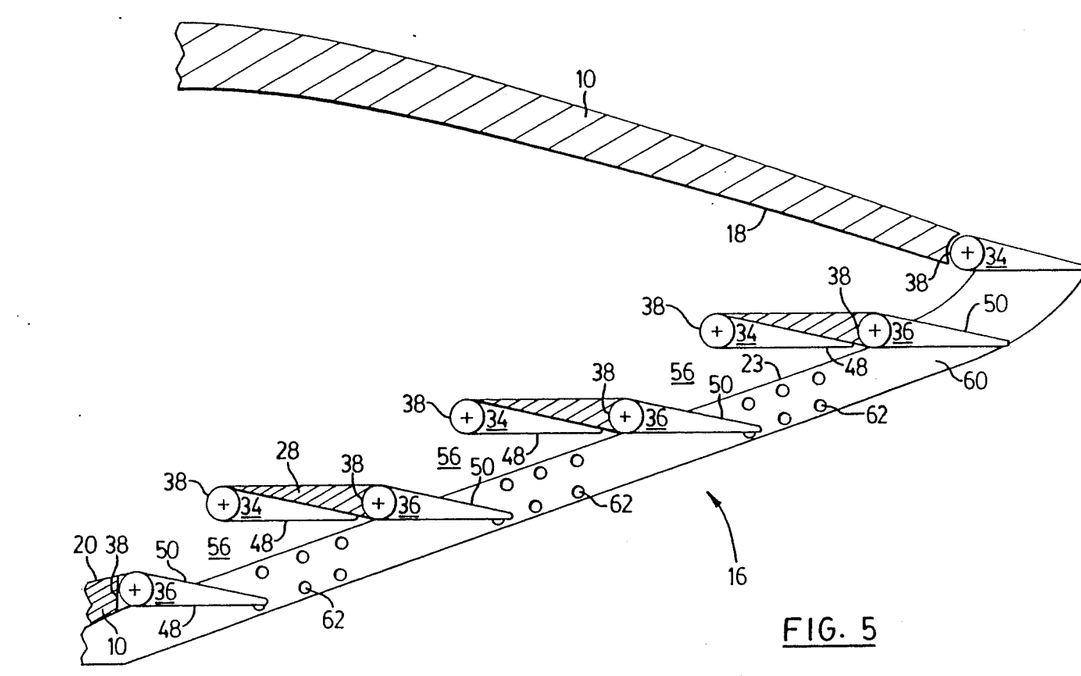
FIG. 5 shows the thrust vectoring structure of FIG. 1 with the flaps in a horizontal position with the leading faces of the front flaps and the trailing faces of the rear flaps diverging to form divergent thrust nozzles.

FIG. 5 shows the flaps rotated to a horizontal divergent position. In this horizontal divergent position, the leading faces 48 of the front flaps and the trailing faces 50 of the rear flaps immediately below them diverge away from the leading edge 38 of the rear flaps to form a generally rearwardly directed divergent horizontal thrust nozzle 56 therebetween. Such a divergent horizontal thrust nozzle is desirable to allow the pressurized gas to exit through the opening of the outlet 16 at supersonic speeds.

Figure 3:
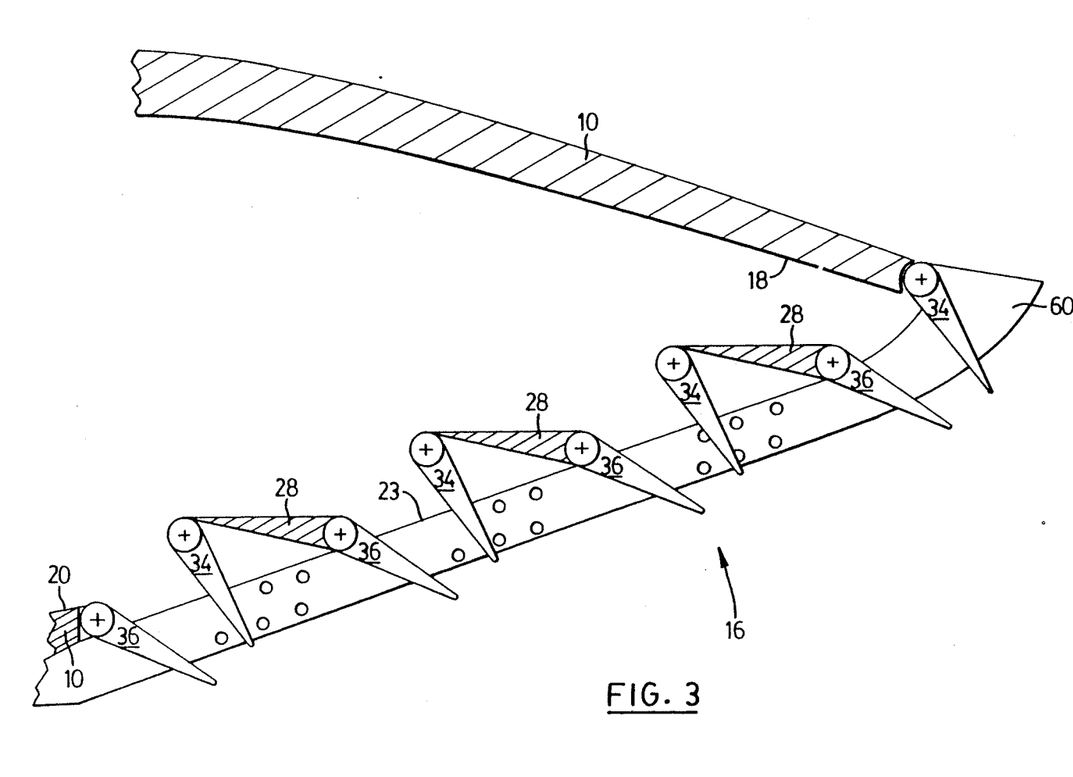
FIG. 3 shows the thrust vectoring structure of FIG. 1 with the flaps rotated approximately mid-way between the horizontal and vertical position.

FIG. 3 shows the flaps rotated to a position between the horizontal and vertical positions. In this configuration, the pressurized gas exits from the outlet 16 in a generally rearward and downward direction. This configuration of the nozzles is used in the transition from vertical flight to horizontal flight as it generates both vertical and horizontal thrust components.

The forward flaps 34 and the dividers 28 are shown as having co-operating tear-drop shaped configurations. This enables the front flaps 34 to rotate under the dividers in the horizontal position as shown in FIGS. 4 and 5 to minimize the amount of obstruction they provide to the pressurized gas flowing around them.

Figure 6:
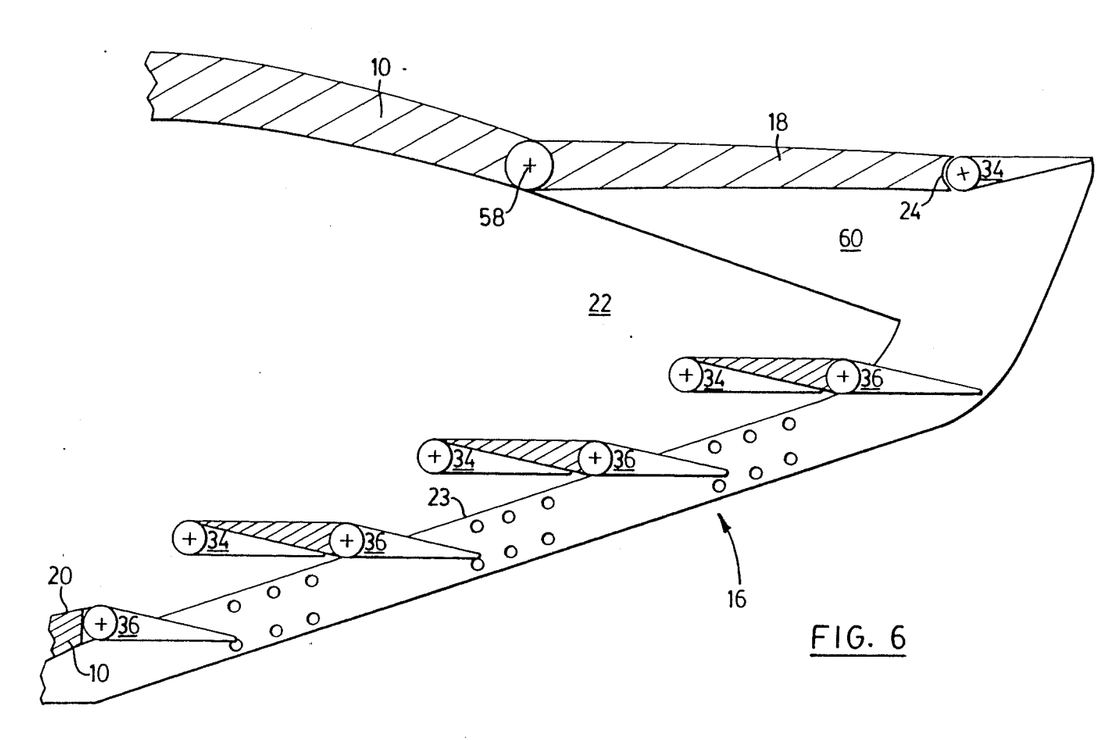
FIG. 6 shows an alternate embodiment of a thrust vectoring structure according to the present invention wherein the top of the outlet is rotatable away from the bottom.

In the embodiment shown in FIGS. 1 through 5, the top 18 of the outlet 16 is shown as being a rigid, continuous part of the fuselage 10. In some instances it is desirable to be able to vary the cross sectional area of the outlet 16. FIG. 6 shows a thrust vectoring structure according to the present invention in which the top is movable to vary the area of the opening. In FIG. 6, the top 18 of the outlet 16 is rotatable about a top axis 58 forward of and generally parallel to the top edge 24. FIG. 6 shows the top 18 rotated anti-clockwise about the top axis 58 from the position in FIGS. 1 through 5. It can be seen from FIG. 6 that this has the effect of enlarging the area of the opening 16 of the outlet. Rotation of the top 18 clockwise would decrease this area. To ensure that pressurized gas does not flow out laterally between the top 18 and the sides of the outlet 16, the end plate 60 in this embodiment must extend upwardly so as to be adjacent the sides of the top 18 when the top 18 is in the raised position. This is illustrated in FIG. 6.

Various other modifications and changes will occur to those skilled in the art without departing from the scope of the invention as defined in the attached claims.

I claim:

1. A thrust vectoring structure for use in a VSTOL Aircraft having a pressurized gas generator and at least one generally rearwardly facing outlet fluidly communicating with said pressurized gas generator and through which pressurized gas in discharged to provide thrust for said aircraft, and in which said outlet has an opening defined by a top, a bottom and sides extending between said top and said bottom, said top and said bottom having respective top and bottom edges toward the rear of said aircraft, said top extending rearwardly of said bottom, said thrust vectoring structure comprising:

at least one generally horizontal divider extending between said sides of said opening, said divider having a forwardly facing front edge and a rearwardly facing rear edge;

a plurality of front and rear flaps; said front flaps being mounted adjacent said top and front edges, said rear flaps being mounted adjacent said rear and bottom edges;

each of said flaps having a leading edge and a trailing edge and being rotatable about an axis adjacent and generally parallel to said leading edge, the rotational axis of each of said front, flaps being rearward and above the rotational axis of one of said rear flaps;

said flaps being rotatable from a horizontal thrust position wherein said trailing edges of said flaps extend generally rearwardly, to a vertical thrust position wherein said trailing edges of said flaps extend generally downwardly;

in said horizontal position said trailing edge of each of said rear flaps extend rearwardly of said leading edge of the front flap immediately thereabove to define a generally horizontal thrust nozzle therebetween; and, in said vertical position, the trailing edge of each of said front flaps depends below the leading edge of the rear flap immediately therebelow to define a generally vertical thrust nozzle therebetween, and each of said dividers and said flaps mounted adjacent thereto define a spacing channel below each of said dividers, said spacing channels being interspersed between said vertical thrust nozzles, said spacing channels having means for enabling entrainment of ambient air into said pressurized gas being discharged from said nozzles.

2. A thrust vectoring structure according to claim 1 wherein said flaps have a leading face opposite a trailing face; and, in said horizontal and vertical thrust positions said leading faces of each of said flaps being generally convergent with said trailing faces of said rear flaps on the opposite side of said thrust nozzle defined therebetween.

3. A thrust vectoring structure according to claim 2 wherein said flaps are further rotatable to a vertical divergent position wherein said leading faces of said front flaps and said trailing faces of said rear flaps on opposite sides of each said vertical thrust nozzle diverge whereby a generally downwardly directed divergent vertical thrust nozzle is formed therebetween.

4. A thrust vectoring structure according to claim 2 wherein said flaps are further rotatable to a horizontal divergent position wherein said leading faces of said front flaps and said trailing faces of said rear flaps on opposite sides of each of said horizontal thrust nozzles diverge whereby a generally rearwardly directed divergent horizontal thrust nozzle is formed therebetween.

5. A thrust vectoring structure according to claim 2 wherein said flaps are further rotatable to a vertical divergent position wherein said leading faces of said front flaps and said trailing faces of said rear flaps on opposite sides of each of said vertical downthrust nozzles diverge whereby a generally downwardly directed divergent vertical thrust nozzle is formed therebetween; and, said flaps are still further rotatable to a horizontal divergent position wherein said trailing faces of said rear flaps on opposite sides of each of said horizontal thrust nozzles diverge whereby a generally rearwardly directed divergent horizontal thrust nozzle is defined therebetween.

6. A thrust vectoring structure according to claims 1, 2 or 3 wherein said outlet converges toward said opening and said top is rotatable about a top axis forward of and generally parallel to said top edge to vary the cross-sectional area of said outlet adjacent said opening.

7. A thrust vectoring structure according to claims 4 or 5 wherein said outlet converges toward said opening and said top is rotatable about a top axis forward of and generally parallel to said top edge to vary the cross-sectional area of said outlet adjacent said opening.

8. A VSTOL aircraft having: a pressurized gas generator; at least one generally rearwardly facing outlet fluidly communicating with said pressurized gas generator and through which pressurized gas is discharged to provide thrust for said aircraft, said outlet having an opening defined by a top, a bottom and sides extending between said top and said bottom, said top and said bottom having respective top and bottom edges toward the rear of said aircraft, said top extending rearwardly of said bottom; and, a thrust vectoring structure having;
at least one generally horizontal divider extending between said sides of said opening, said divider having a forwardly facing front edge and a rearwardly facing rear edge;
a plurality of front and rear flaps; said front flaps being mounted adjacent said top and front edges, said rear flaps being mounted adjacent said rear and bottom edges;
each of said flaps having a leading edge opposite a trailing edge and being rotatable about an axis adjacent and generally parallel to said leading edge, the rotational axis of each of said front flaps being rearward and above the rotational axis of one of said rear flaps;
said flaps being rotatable from a horizontal thrust position wherein said trailing edges of said flaps extend generally rearwardly, to a vertical thrust position wherein said trailing edges of said flaps extend generally downwardly;
in said horizontal position the trailing edge of each of said rear flaps extends rearwardly from the leading edge of the front flap immediately thereabove to define a generally horizontal thrust nozzle and,
in said vertical position, the trailing edge of each of said front flaps extends below the leading edge of the rear flap immediately therebelow to define a generally vertical thrust nozzle therebetween, and each of said dividers and said flaps mounted adjacent thereto define a spacing channel below each of said dividers, said spacing channels being interspersed between said vertical thrust nozzles, said spacing channels having means for enabling entrainment of ambient air into said pressurized gas being discharged from said nozzles.

9. A VSTOL aircraft according to claim 8 wherein said flaps of said thrust vectoring structure further have a leading face opposite a trailing face; and, in said horizontal and vertical thrust positions said leading faces of each of said flaps being generally convergent with said trailing faces of said rear flaps on the opposite side of said thrust nozzle defined therebetween.

10. A VSTOL aircraft according to claim 9 wherein said flaps of said thrust vectoring structure are further rotatable to a vertical divergent position wherein said leading faces of said front flaps and said trailing faces of said rear flaps on opposite sides of each said vertical thrust nozzle diverge whereby a generally downwardly directed divergent vertical thrust nozzle is formed therebetween.

11. A VSTOL aircraft according to claim 9 wherein said flaps of said thrust vectoring structure are further rotatable to a horizontal divergent position wherein said leading faces of said front flaps and said trailing faces of said rear flaps on opposite sides of each of said horizontal thrust nozzles diverge whereby a generally rearwardly directed divergent horizontal thrust nozzle is formed therebetween.

12. A VSTOL aircraft according to claim 9 wherein said flaps of said thrust vectoring structure are further rotatable to a vertical divergent position wherein said leading faces of said front flaps and said trailing faces of said rear flaps on opposite sides of each of said vertical downthrust nozzles diverge whereby a generally downwardly directed divergent vertical thrust nozzle is formed therebetween; and, said flaps are still further rotatable to a horizontal divergent position wherein said trailing faces of said rear flaps on opposite sides of each of said horizontal thrust nozzles diverge whereby a generally rearwardly directed divergent horizontal thrust nozzle is defined therebetween.

13. A VSTOL aircraft according to claims 8, 9 or 10 wherein said outlet converges toward said opening and said top is rotatable about a top axis forward of and generally parallel to said top edge to vary the cross-sectional area of said outlet adjacent said opening.

14. A VSTOL aircraft according to claims 11 or 12 wherein said outlet converges toward said opening and said top is rotatable about a top axis forward of and generally parallel to said top edge to vary the cross-sectional area of said outlet adjacent said opening.

15. A thrust vectoring structure according to claims 1, 2, 3, 4, 8, 9, 10, 11, or 12 wherein end plates are provided across said spacing channels, and said means for enabling entrainment of ambient air includes holes through said end plates fluidly communicating with the interior of said spacing channels.

16. A thrust vectoring structure according to claim 6 wherein end plates are provided across said spacing channels, and said means for enabling entrainment of ambient air includes holes through said end plates fluidly communicating with the interior of said spacing channels.

17. A thrust vectoring structure according to claim 7 wherein end plates are provided across said spacing channels, and said means for enabling entrainment of ambient air includes holes through said end plates fluidly communicating with the interior of said spacing channels.

18. A thrust vectoring structure according to claim 13 wherein end plates are provided across said spacing channels, and said means for enabling entrainment of ambient air includes holes through said end plates fluidly communicating with the interior of said spacing channels.

19. A thrust vectoring structure according to claim 14 wherein end plates are provided across said spacing channels, and said means for enabling entrainment of ambient air includes holes through said end plates fluidly communicating with the interior of said spacing channels.

* * * * *